United States Patent [19]
Brown

[11] Patent Number: 5,482,166
[45] Date of Patent: Jan. 9, 1996

[54] MEAT TRIM SORTING

[75] Inventor: Gary Brown, Milton Freewater, Oreg.

[73] Assignee: Key Technology, Inc., Walla Walla, Wash.

[21] Appl. No.: 301,200

[22] Filed: Sep. 6, 1994

[51] Int. Cl.⁶ .............................. B07C 5/00; B26D 5/00
[52] U.S. Cl. ....................... 209/580; 209/587; 209/639; 209/934; 209/939; 83/360; 83/408; 83/932
[58] Field of Search ................................. 209/576, 580, 209/581, 582, 587, 639, 934, 938, 939; 83/102, 105, 106, 110, 360, 404, 407, 408; 932

[56] References Cited

U.S. PATENT DOCUMENTS

| | | |
|---|---|---|
| 2,357,566 | 9/1944 | Walter et al. ........................ 99/510 X |
| 2,373,361 | 4/1945 | Walter ................................. 209/587 X |
| 3,044,619 | 7/1962 | Knolle ..................................... 209/33 |
| 3,312,343 | 4/1967 | Elder et al. .......................... 209/139.1 |
| 3,489,277 | 1/1970 | Silverman ............................... 209/587 |
| 3,572,503 | 3/1971 | Hezel ..................................... 209/643 |
| 3,581,888 | 6/1971 | Mounce et al. .................... 209/639 X |
| 3,598,163 | 8/1971 | Urschel et al. ...................... 83/408 X |
| 3,930,991 | 1/1976 | Gillespie ............................ 209/580 X |
| 3,977,526 | 8/1976 | Gordon et al. ..................... 209/639 X |
| 4,083,277 | 4/1978 | Lotz .................................... 83/110 X |
| 4,122,952 | 10/1978 | Richards ................................ 209/579 |
| 4,201,302 | 5/1980 | Roth ...................................... 209/577 |
| 4,513,868 | 4/1985 | Culling et al. ......................... 209/581 |
| 4,624,367 | 11/1986 | Shafer et al. .......................... 209/577 |
| 4,657,144 | 4/1987 | Martin et al. .......................... 209/546 |
| 4,699,273 | 10/1987 | Suggi-Liverani et al. ............. 209/580 |
| 4,909,930 | 3/1990 | Cole ...................................... 209/564 |
| 4,919,027 | 4/1990 | Littleton ............................. 83/102 X |
| 4,970,757 | 11/1990 | Heiland et al. ..................... 83/360 X |
| 5,215,772 | 6/1993 | Roth .................................. 209/577 X |
| 5,271,304 | 12/1993 | Wygal et al. ........................... 83/422 |

FOREIGN PATENT DOCUMENTS

PCT/NL81/
  00017  12/1981  WIPO .

Primary Examiner—William E. Terrell
Assistant Examiner—Tuan Nguyen
Attorney, Agent, or Firm—Wells, St. John, Roberts, Gregory & Matkin

[57] ABSTRACT

A sorting system is disclosed for reclaiming lean meat from highfat meat trimmings. The sorting system includes a meat dicing machine which receives laterally extending whole meat trimmings and which dices such meat trimmings without grinding or extruding, and without disturbing the lateral distribution of the meat. This results in a lateral distribution of meat trimmings, without requiring vibratory distribution which is disfavored in meat processing plants. A wide-belt inspection conveyor is positioned at the downstream end of the meat dicing machine to receive the laterally distributed meat dices. The wide-belt inspection conveyor operates at a greater linear speed than does the meat dicing machine to longitudinally space the meat dices from each other. An optical inspection and sorting station is positioned at the downstream end of the wide-belt inspection conveyor to differentiate relatively lean meat dices from relatively fatty meat dices and to separate such meat dices from each other.

15 Claims, 3 Drawing Sheets

MEAT TRIM SORTING

TECHNICAL FIELD

This invention relates to methods and systems for reclaiming lean meat from high-fat meat trimmings using high-speed wide-belt sorting equipment.

BACKGROUND OF THE INVENTION

Processing meat such as beef and pork results in a significant amount of trimmings which are comprised primarily of fat. Such trimmings typically have a very low economic value. However, meat trimmings contain portions of relatively lean meat. The desirability of reclaiming these lean portions has been recognized in the prior art. Prior art systems reclaim lean meat from trimmings by grinding and extruding the trimmings and cutting or forming the ground and extruded trimmings into small pieces for subsequent sorting of relatively lean pieces from relatively fatty pieces. Sorting is based upon the colors of the ground pieces.

Such systems have a number of shortcomings. For instance, grinding and extruding the meat tends to mix fat and lean components, making meaningful sorting difficult or impossible. It has also been found that grinding and extruding tends to blur or smear any color distinctions between product types. This makes subsequent optical inspection difficult or impossible, because optical discriminations must essentially be made based upon the average color or shade of the meat pieces.

A further disadvantage of existing methods and systems is that ground meat tends to become sticky or gummy, and to adhere to conveyors which are used to move the meat through processing or inspection stations. This creates a product handling problem and also results in a significant loss of fat as it adheres to support surfaces. Ground meat also tends to clump. Again, this complicates and reduces the efficiency of inspection and sorting. An even further disadvantage of existing systems is that most methods of grinding and extruding generate a very narrow stream of meat pieces. Such a narrow stream makes it difficult to exploit the efficiencies which might otherwise be obtained when using modern high-speed wide-belt optical inspection and sorting systems.

To combat the problems noted above, some prior art systems have resorted to freezing the meat during processing. This helps reduce clumping and color blurring, but can be expensive and inconvenient. Other prior art systems ;have employed vibratory elements or shakers to reduce clumping and to spread ground pieces laterally so that downstream wide-belt sorters can be used to their fullest advantage. However, vibratory elements are disfavored in meat processing plants, primarily because of the difficulty of cleaning them.

The invention described below avoids the noted disadvantages of prior art meat sorting systems. It provides a laterally-distributed high-speed flow of meat pieces for efficient automated inspection and sorting with modern equipment. It does not require freezing the meat and does not require using any vibratory elements.

DETAILED DESCRIPTION OF THE PREFERRED EMBODIMENTS

This disclosure of the invention is submitted in furtherance of the constitutional purposes of the U.S. Patent Laws "to promote the progress of science and useful arts." U.S. Constitution, Article 1, Section 8.

Figure 1:
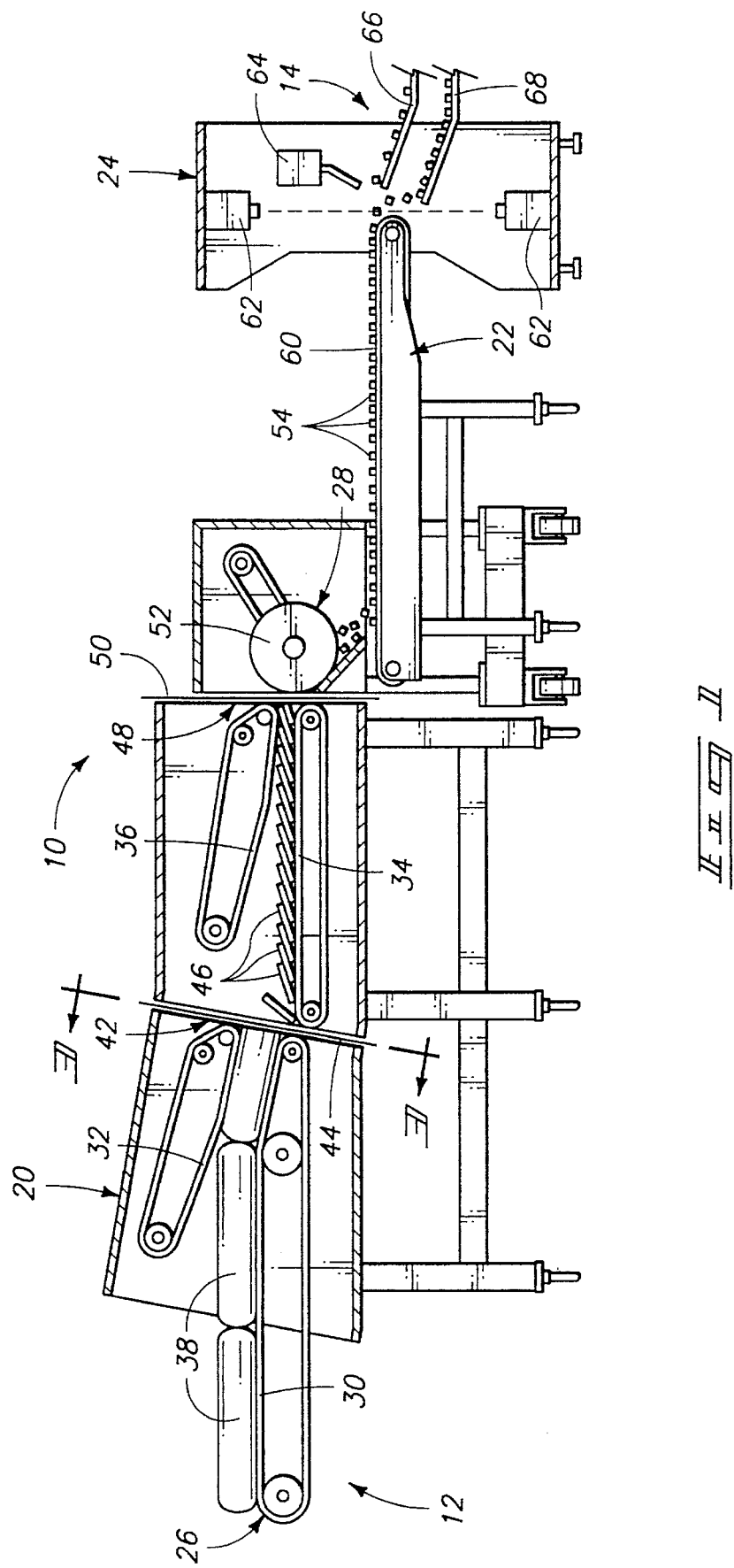
FIG. 1 is a simplified lengthwise sectional side view of a meat trimmings sorting system in accordance with a preferred embodiment of the invention.
Figure 2:
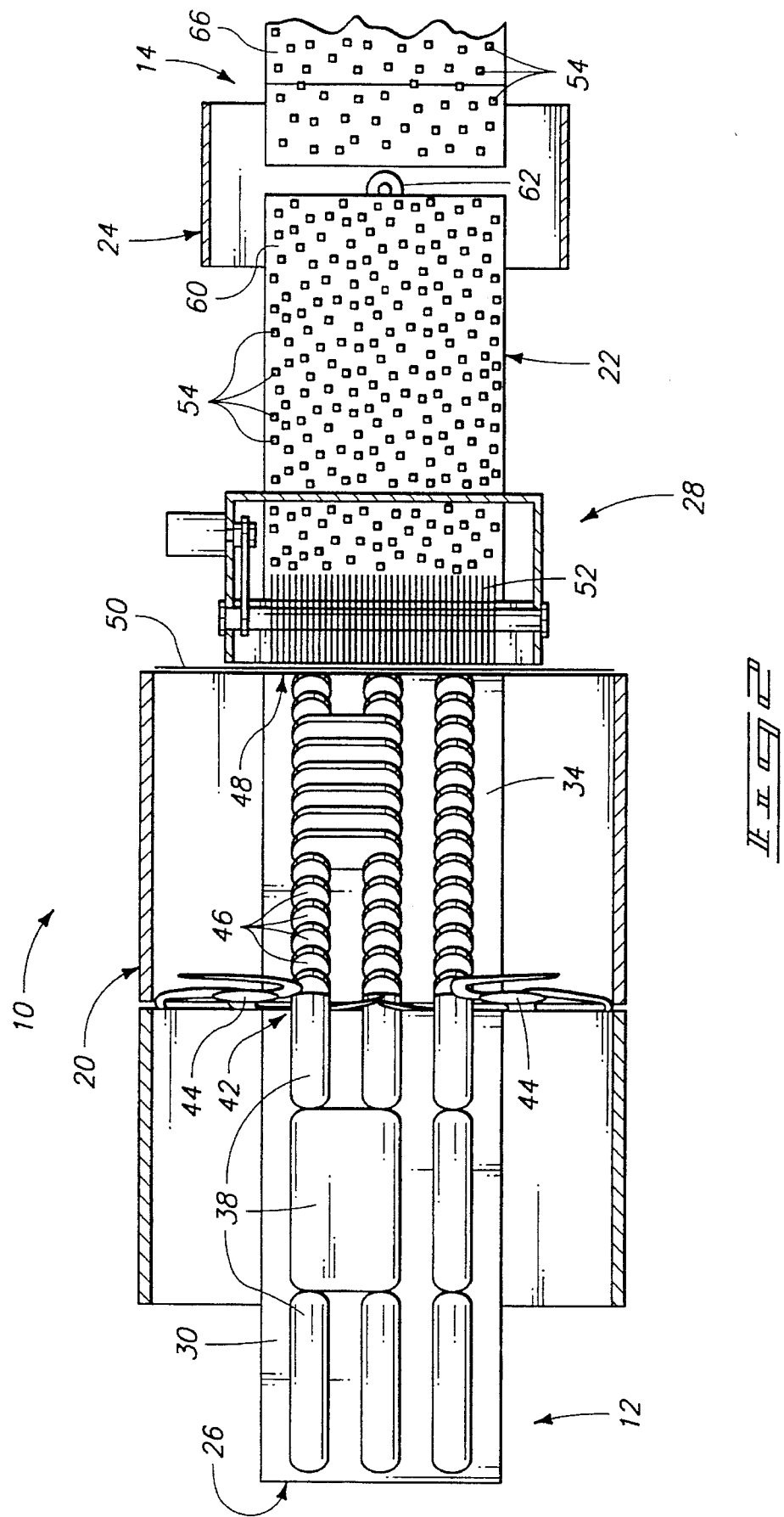
FIG. 2 is a simplified sectional top view of the sorting system shown in FIG. 1.

FIGS. 1 and 2 show a sorting system in accordance with the invention, generally designated by the reference numeral 10. Sorting system 10 includes a product conveyor or conveyors which convey and process whole meat trimmings. System 10 is designed to efficiently reclaim lean meat from high-fat meat trimmings. To this end, sorting system 10 includes components and means for accepting whole meat trimmings at an upstream end 12 and for conveying them longitudinally to a downstream end 14. Sorting system 10 further includes means for dicing the trimmings without disturbing their lateral positioning relative to the product conveyors to create a plurality of laterally-distributed meat dices. The laterally-distributed meat dices are received on a highspeed wide-belt inspection conveyor without any intervening vibratory distribution elements. The high-speed inspection conveyor operates at a speed which is sufficient to space the meat dices longitudinally from each other. Sorting system 10 also includes an optical inspection and sorting station for inspecting the laterally distributed and longitudinally spaced meat dices, for differentiating relatively lean meat dices from relatively fatty meat dices, and for separating such meat dices from each other.

To accomplish these functions, the preferred sorting system 10 comprises an upstream meat dicing machine 20, a downstream wide-belt inspection conveyor 22, and an optical inspection and sorting station 24. Meat dicing machine 20 contains a whole trimmings conveyor which conveys laterally extending whole meat trimmings longitudinally from a trimmings conveyor upstream end 26 to a trimmings conveyor downstream end 28. The whole trimmings conveyor supports the whole trimmings relative to one or more cutters. The cutters are positioned relative to the whole trimmings conveyor to cut or dice the laterally extending whole meat trimmings in at least three directions without disturbing the lateral positioning of the meat. This results in a plurality of meat pieces or dices which remain laterally distributed after being cut, without requiring vibratory lateral distribution. The meat pieces are produced without grinding or extruding the meat trimmings.

More specifically, the upstream whole trimmings conveyor comprises first lower and upper endless belt conveyors 30 and 32, and second lower and upper endless conveyor belts 34 and 36. These conveyor belts are relatively wide to support whole meat trimmings oriented laterally across the belts. The belts are preferably at least 24 inches wide. In the preferred embodiment described herein the belts are approximately 56 inches wide. In operation, whole meat trimmings 38 are placed on first lower endless conveyor belt 30. Belt 30 carries trimmings 38 beneath first upper endless conveyor belt 32. Belt 32 is mounted so that it "floats" relative to first lower belt 30. As meat trimmings 38 enter the region between first upper and lower conveyor belts 30 and 32, upper belt 32 rises to accommodate the height of the meat trimmings. However, upper belt 32 continues to exert significant downward pressure on meat trimmings 38.

Figure 3:
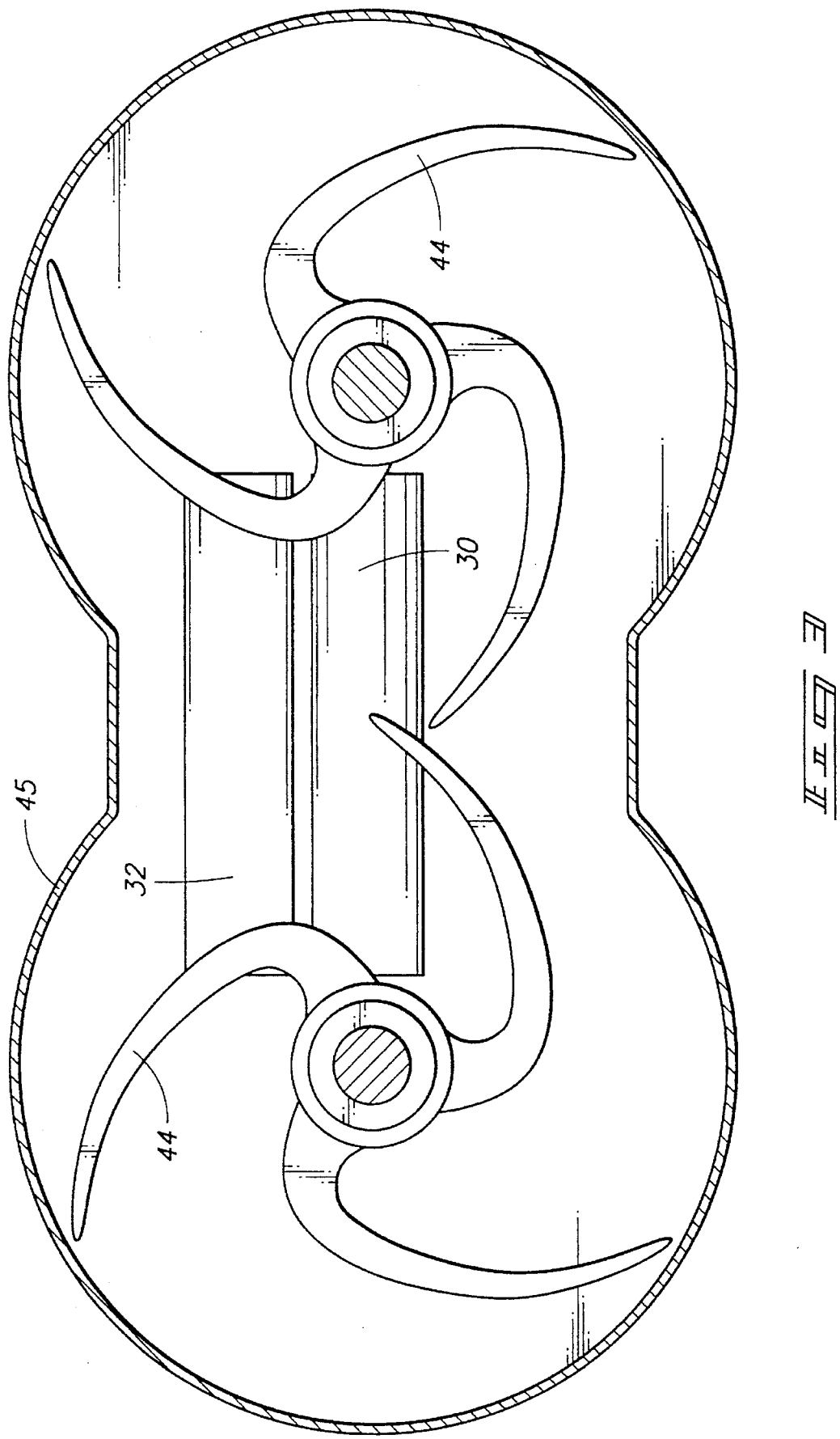
FIG. 3 is a simplified cross-sectional view of the sorting system shown in FIGS. 1 and 2, taken along the line 3—3 of FIG. 1.

The meat trimmings are conveyed between first upper and lower belts 30 and 32 to a first cutoff point 42. A first pair of counterrotating spiral-shaped cutoff knives or cutters 44, mounted in a generally upright plane to rotate around a longitudinal axis, are positioned immediately adjacent first cutoff point 42 to intercept meat trimmings 38 as they emerge from between first upper and lower belts 30 and 32. Cutoff knives 44 are best shown in FIG. 3, which also shows a protective shroud 45 surrounding the knives. The rotational speed of cutoff knives 44 is adjusted in combination with the linear speed of belts 30 and 32 to cut meat trimmings 38 into slabs 46 of desired thicknesses. The particular arrangement shown allows the cutting to be accomplished without disturbing the lateral positioning of the meat trimmings. Slabs 46 remain laterally distributed across the width of upstream meat dicing machine 20.

Slabs 46 fall onto second lower endless conveyor belt 34. As they land on belt 34, they fall forward and come to rest in nearly horizontal positions, slightly overlapping and resting on each other. Belt 34 carries slabs 46 beneath second upper endless conveyor belt 36 which accommodates their height just as already described with reference to first upper belt 32.

Meat slabs 46 are conveyed between second upper and lower belts 34 and 36 to a second cutoff point 48. A second pair of counterrotating spiral-shaped cutoff knives 50, similar to cutoff knives 44 already described, are mounted in a generally upright plane immediately adjacent second cutoff point 48 to intercept meat slabs 46 as they emerge from between second upper and lower belts 34 and 36. The rotational speed of cutoff knives 50 is adjusted in combination with the linear speed of belts 34 and 36 to cut meat slabs 46 into strips (not visible in FIGS. 1 and 2) of desired dimensions. Again, the cutting or slicing is accomplished without disturbing the lateral positioning of the meat.

Immediately downstream of second cutoff knives 50 is a ganged group of spaced circular slicing knives 52, mounted to rotate together around a lateral axis. The strips cut by second cutoff knives 50 are fed directly beneath knives 52. Knives 52 cut the meat strips into meat cubes or dices 54 of desired dimensions. Once again, this cutting step does not disturb the lateral positioning of the meat. Dices 54 are laterally distributed across the width of meat dicing machine 20 as they emerge from knives 52. The various components are adjusted to produce meat dices having crosswise dimensions in the range of ¼" to 2", and even more preferably in the range of ½" to ¾". The preferred embodiment is adjusted to produce dices having crosswise dimensions of approximately ¾".

A dicing machine similar to this is described in U.S. Pat. No. 5,271,304 to Gary L. Wygal, which is hereby incorporated by reference. The dicing machine described in the Wygal patent is manufactured by Carruthers Equipment Co. of Warrenton, Oregon, under the trademark Auto-Slicer. The Auto-Slicer dicing machine uses only a single blade at each cutoff point, and is therefore somewhat narrower than the dicing machine shown in the preferred embodiment. However, Carruthers Equipment Co. also sells a wider machine referenced by the trademark Mega-Slicer. The Mega-Slicer dicing machine is substantially identical to the dicing machine 20 described above, and is used in the preferred embodiment of the invention.

Downstream inspection conveyor 22 is positioned at downstream end 28 of meat dicing machine 20 to receive laterally-distributed meat dices 54 as they fall from knives 52. Inspection conveyor 22 incorporates a high-speed endless inspection belt 60, operating at a linear speed which is significantly greater than the linear speed of the belts of dicing machine 20. High-speed belt 60 preferably operates at a speed of at least 400 feet per minute. In the preferred embodiment, it operates at over 500 feet per minute. In comparison, the belts of dicing machine 20 operate at an approximate linear speed of 50 feet per minute. The relatively higher speed of wide-belt inspection conveyor 22 serves to longitudinally space the meat dices from each other. As described, the particular characteristics of meat dicing machine 20 ensure also that the meat dices are laterally spaced and distributed across inspection belt 60 without the use of any intervening vibratory distribution or conveyance elements such as shakers or vibratory conveyors. Inspection conveyor 22 is preferably about ten feet long to ensure that the meat pieces are settled and moving at the same speed as belt 60 by the time they reach the end of the belt. The width of inspection belt 60 is approximately the same or slightly greater than that of the whole trimmings conveyor of meat dicing machine 20.

Optical inspection and sorting station 24 is positioned relative to the lateral distribution of meat pieces carried by inspection conveyor 22 to differentiate relatively lean meat dices from relatively fatty meat dices and to separate such meat dices from each other. More specifically, sorting station 24 is positioned just downstream of inspection belt 60. The linear speed of inspection belt 60 is great enough to launch the laterally distributed meat dices therefrom for in-air inspection by sorting station 24. Sorting station 24 has one or more electronic cameras 62 positioned to view the in-air dices from different angles. A bank of air ejectors 64 is positioned to knock selected dices downward. Dices which are undisturbed by ejectors 64 are received by an upper chute or other conveyor 66. Dices diverted from their natural trajectory by ejectors 64 are received by a lower chute or other conveyor 68.

Optical inspection and sorting station 24 is preferably a ColorSort® IIM system manufactured by Key Technology, Inc., of Walla Walla, Wash. This machine is a high-speed color video sorting system which can be configured to sort meat trim dices in a variety of ways based upon color characteristics. While the embodiment shown uses only a single sorting station, it may be desirable in many applications to use two or more sorting stations in tandem. For instance, a first or rough sort can be performed by a first station, with two additional stations providing finer sorts of the output of the first station. Systems such as this, which have previously been used when sorting other types of products such as vegetables, can advantageously be used to obtain the best possible sorting of meat trim dices in the context of this invention.

The system described above is capable of sorting as much as 15,000 pounds per hour of random meat trimmings. It accomplishes this without requiring freezing of the meat. Even without such freezing, there is little or no clumping and no vibratory elements are required to break apart meat pieces. Furthermore, vibratory elements are not required to laterally distribute the cut meat pieces prior to optical inspection. In meat processing plants, the elimination of vibratory conveyors or shakers is a significant advantage.

Dicing or cutting the trimmings, without grinding or extruding, eliminates mixing of fatty and lean trimmings components, and also reduces color blurring between the product components. This allows the meat pieces to be optically sorted with much higher selectivity and efficiency than has previously been possible with ground or extruded trimmings. It has been found that avoiding grinding greatly increases the economic value of reclaimed meat, since the uses for ground meat are very limited. Furthermore, avoiding grinding and extruding has reduced the loss of fat which would otherwise result from such fat sticking to support surfaces.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A sorting system for reclaiming lean meat from high-fat meat trimmings, comprising:
   a whole trimmings conveyor which conveys laterally extending whole meat trimmings longitudinally;
   a cutter positioned relative to the whole trimmings conveyor to dice the laterally extending whole meat trimmings without disturbing the lateral positioning of the meat trimmings, the cutter cutting the whole meat trimmings into a plurality of meat dices which remain laterally distributed after being cut;
   a high-speed wide-belt inspection conveyor positioned to receive the laterally distributed meat dices directly from the whole trimmings conveyor, the meat dices remaining laterally distributed on the high-speed wide-belt inspection conveyor; and
   an inspection and sorting station positioned relative to the high-speed wide-belt inspection conveyor to differentiate relatively lean meat dices from relatively fatty meat dices and to separate said meat dices from each other, the inspection station disposed in signal transmitting relation relative to the sorting station.

2. A sorting system as recited in claim 1, wherein the whole trimmings conveyor operates at a first linear speed and the high-speed wide-belt inspection conveyor is positioned to receive the laterally distributed meat dices directly from the whole trimmings conveyor, and the high-speed wide-belt inspection conveyor operates at a second linear speed which is greater than the first linear speed to longitudinally space the meat dices from each other before they are separated by the inspection and sorting station.

3. A sorting system as recited in claim 1, wherein the wide-belt inspection conveyor operates at a speed which launches the meat dices therefrom for inspection by the inspection and sorting station.

4. A sorting system as recited in claim 1, wherein the wide-belt inspection conveyor operates at a speed of at least 400 feet per minute.

5. A sorting system as recited in claim 1, wherein the whole trimmings conveyor and the wide-belt inspection conveyor are at least 24 inches wide.

6. A sorting system for reclaiming lean meat from high-fat meat trimmings, comprising:
   a whole trimmings conveyor which conveys laterally extending whole meat trimmings longitudinally at a first linear speed from a trimmings conveyor upstream end to a trimmings conveyor downstream end;
   a cutter positioned relative to the whole trimmings conveyor to cut the laterally extending whole meat trimmings in at least two directions without disturbing the lateral positioning of the meat trimmings, the cutter cutting the whole meat trimmings into a plurality of meat dices which remain laterally distributed after being cut;
   a wide-belt inspection conveyor positioned at the downstream end of the trimmings conveyor to receive the laterally distributed meat dices directly therefrom, the wide-belt inspection conveyor operating at a second linear speed which is greater than the first linear speed to longitudinally space the meat dices from each other;
   an optical inspection and sorting station positioned relative to the high-speed wide-belt inspection conveyor to differentiate relatively lean meat dices from relatively fatty meat dices and to separate said meat dices from each other, the optical inspection station disposed in signal transmitting relation relative to the sorting station.

7. A sorting system as recited in claim 6, wherein the second linear speed of the wide-belt inspection conveyor is great enough to launch the meat dices therefrom for in-air inspection by the inspection and sorting station.

8. A sorting system as recited in claim 6, wherein the second linear speed of the wide-belt inspection conveyor is at least 400 feet per minute.

9. A sorting system as recited in claim 6, wherein the whole trimmings conveyor and the wide-belt inspection conveyor are at least 24 inches wide.

10. A sorting system for reclaiming lean meat from high-fat meat trimmings, comprising:
    a product conveyor which conveys laterally extending whole meat trimmings from an upstream end to a downstream end;
    a cutter positioned relative to the product conveyor to cut the laterally extending whole meat trimmings without disturbing the lateral positioning of the meat trimmings into a plurality of meat pieces which remain laterally distributed on the product conveyor after being cut;
    an inspection conveyor positioned to receive the meat pieces and longitudinally space the meat pieces from each other on the inspection conveyor and to move the laterally and longitudinally distributed meat pieces past an inspection station to a sorting station;
    an inspection device positioned at the inspection station for inspecting the laterally distributed cut meat pieces as the pieces are moved past the inspection station to differentiate relatively lean meat pieces from relatively fatty meat pieces; and
    a sorter at the sorting station to separate said lean meat pieces from the relatively fatty pieces and which is disposed in signal receiving relation relative to the inspection device.

11. A sorting system as recited in claim 10, wherein the product conveyor comprises
    a whole trimmings conveyor which supports the whole trimmings relative to the cutter, the whole trimmings conveyor operating at a first linear speed, and the
    inspection conveyor operates at a second linear speed which is greater than the first linear speed to longitudinally space the meat pieces from each other.

12. A sorting system as recited in claim 10, and further comprising a plurality of the cutters to cut the whole meat trimmings in at least two directions.

13. A sorting system as recited in claim 10, wherein the product conveyor is at least 24 inches wide.

14. A method of reclaiming lean meat from high-fat meat trimmings comprising:
  dicing laterally extending whole meat trimmings without disturbing the lateral positioning of the meat trimmings, said dicing creating a plurality of laterally distributed meat dices;
  receiving the laterally distributed meat dices on a high-speed wide-belt inspection conveyor without disturbing their lateral distribution, the wide-belt inspection conveyor operating at a speed which spaces the meat dices longitudinally from each other;
  inspecting the laterally distributed and longitudinally spaced meat dices to differentiate relatively lean meat dices from relatively fatty meat dices;
  providing a signal which corresponds to the characteristics of the meat dices which have been inspected; and
  separating said meat dices from each other based upon the signal provided.

15. A sorting system for reclaiming lean meat from high-fat meat trimmings:
  a first conveyor having an upstream and a downstream end for transmitting the meat trimmings along a given course of travel;
  a second conveyor having an upstream and downstream end, the second conveyor disposed in receiving relationship relative to the downstream end of the first conveyor;
  a first cutter positioned intermediate the first and second conveyors to cut the whole meat trimmings without disturbing the lateral positioning of the meat trimmings, the first cutter slicing the meat trimmings in a given first direction;
  a second cutter disposed at the downstream end of the second conveyor, the second conveyor cutting the meat trimmings again in the first direction;
  a third cutter disposed downstream of the second cutter and cutting the meat trimmings in a given second direction to produce discrete dices of meat;
  an inspection conveyor disposed in receiving relation relative to the third cutter and moving at a predetermined speed which longitudinally spaces the discrete dices of meat; and
  a sorting station disposed downstream relative to the inspection conveyor, the sorting station visually inspecting and diverting the discreet dices of meat into discrete paths of travel based on their fat characteristics.

* * * * *